United States Patent
Bradley

(10) Patent No.: US 8,966,519 B2
(45) Date of Patent: Feb. 24, 2015

(54) METHOD AND APPARATUS FOR PROVIDING PARENTAL CONTROL USING A PLAYLIST

(75) Inventor: Bruce R. Bradley, Wayne, PA (US)

(73) Assignee: Motorola Mobility LLC, Libertyville, IL (US)

( * ) Notice: Subject to any disclaimer, the term of this patent is extended or adjusted under 35 U.S.C. 154(b) by 304 days.

(21) Appl. No.: 12/976,035

(22) Filed: Dec. 22, 2010

(65) Prior Publication Data

US 2012/0167128 A1    Jun. 28, 2012

(51) Int. Cl.
  *H04N 7/16* (2011.01)
  *H04N 21/6543* (2011.01)
  *H04N 21/258* (2011.01)
  *H04N 21/438* (2011.01)
  *H04N 21/262* (2011.01)

(52) U.S. Cl.
  CPC ..... *H04N 21/6543* (2013.01); *H04N 21/25891* (2013.01); *H04N 21/4383* (2013.01); *H04N 21/26283* (2013.01)
  USPC .................... 725/27; 725/25; 725/28; 725/29

(58) Field of Classification Search
  USPC ............................... 725/27–29, 25
  See application file for complete search history.

(56) References Cited

U.S. PATENT DOCUMENTS

| | | | | |
|---|---|---|---|---|
| 6,115,079 | A * | 9/2000 | McRae | 348/731 |
| 6,177,931 | B1 | 1/2001 | Alexander et al. | |
| 2003/0237088 | A1 | 12/2003 | Macrae et al. | |
| 2006/0179468 | A1 | 8/2006 | Pearson | |
| 2008/0196055 | A1 * | 8/2008 | Sandoval et al. | 725/25 |
| 2008/0229379 | A1 * | 9/2008 | Akhter | 725/139 |
| 2010/0146536 | A1 * | 6/2010 | Craner et al. | 725/28 |
| 2010/0162342 | A1 | 6/2010 | Piepenbrink et al. | |
| 2011/0239253 | A1 * | 9/2011 | West et al. | 725/46 |
| 2012/0072958 | A1 * | 3/2012 | Smyth et al. | 725/93 |

FOREIGN PATENT DOCUMENTS

WO    WO-0059228 A1    10/2000

OTHER PUBLICATIONS

PCT Search Report & Written Opinion, Re: Application #PCT/US2011/065874; Mar. 26, 2012.
Canadian Office Action for related application No. 2,828,758 dated Dec. 1, 2014.

* cited by examiner

*Primary Examiner* — Mulugeta Mengesha
(74) *Attorney, Agent, or Firm* — Honigman Miller Schwartz and Cohn LLP

(57) ABSTRACT

A method for providing parental control via a playlist is disclosed. A playlist is received from a control server. One or more channel change control messages are sent to a client in accordance with a playlist. The one or more channel change control messages include tuning information for tuning to one or more programs or channels at times indicated in the playlist.

An apparatus for providing parental control via a playlist is disclosed. The apparatus may be a content delivery system headend. The content delivery system headend system may have a Switched Digital Video (SDV) manager for coordinating SDV sessions requested by subscribers over an access network. The headend may have an input for receiving content to be broadcast during the SDV sessions. The headend may also have a subscriber control unit for sending one or more channel change control messages to a client device in accordance with a playlist, the one or more channel change control messages including tuning information for tuning to one or more programs or channels at times indicated in the playlist.

13 Claims, 7 Drawing Sheets

| Time | Channel | Program | Rating |
|---|---|---|---|
| 3:00PM | PBS | Clifford the Big Red Dog | TV-Y |
| 3:30PM | TOON | Tom & Jerry | TV-Y |
| 4:00PM | DISN | Winnie the Pooh | TV-Y |
| 4:30PM | PBS | Science Kids | TV-Y |

METHOD AND APPARATUS FOR PROVIDING PARENTAL CONTROL USING A PLAYLIST

BACKGROUND

Present-day set top boxes commonly offer parental control capabilities that limit the content viewable by children in the household. Typically, these products implement a block by rating limit. Content that has a rating higher (more adult) than the set limit will not be viewable on the display. While this is an effective method, it can lead to a frustrating experience given the size of today's channel lineup. For example, if a parent sets a MPAA-G rating limit, the vast majority of channels would be blocked. In this environment, the child may encounter 10 blocked channels for every one allowed. Furthermore, the allowed channels might not be what the parent would recommend if they were sitting next to the child in the room.

There is a need in the art for a parental control solution which more closely mimics the parents guiding hand when the parent is not available.

SUMMARY

A method for providing parental control via a playlist is disclosed. In one embodiment, a playlist is received from a control server. One or more channel change control messages are sent to a client in accordance with a playlist. The one or more channel change control messages include tuning information for tuning to one or more programs or channels at times indicated in the playlist.

An apparatus for providing parental control via a playlist is disclosed. In one embodiment, the apparatus may be a content delivery system headend. The content delivery system headend system may have a Switched Digital Video (SDV) manager for coordinating SDV sessions requested by subscribers over an access network. The headend may have an input for receiving content to be broadcast during the SDV sessions. The headend may also have a subscriber control unit for sending one or more channel change control messages to a client device in accordance with a playlist, the one or more channel change control messages including tuning information for tuning to one or more programs or channels at times indicated in the playlist.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 7 illustrates a playlist in accordance with one embodiment; and

DETAILED DESCRIPTION

As detailed below, parental controls can be implemented in a relatively simple manner in Switched Digital Video (SDV) systems. SDV refers to an arrangement in which broadcast channels are only switched onto the network when they are requested by one or more subscribers, thereby allowing system operators to save bandwidth over their distribution network. In conventional cable or satellite broadcast systems, every broadcast channel is always available to all authorized subscribers. In contrast, a switched digital video channel is only available when requested by one or more authorized subscribers. Also, unlike video on-demand, which switches a singlecast interactive program to a user, switched digital video switches broadcast streams, making each stream available to one or more subscribers who simply join the broadcast stream just as they would with normal broadcast services. That is, once a switched service is streamed to a subscriber, subsequent subscribers associated with the same service group as the first subscriber can tune to the same broadcast stream. The switched digital video will often share the same resource managers and underlying resources with other on-demand services.

SDV systems can simplify implementation of parental controls because each time a user changes from one channel to another, a channel change request is sent from the user's subscriber device (e.g., a set top terminal) to a session manager in the network's headend. Channel change requests are one type of message that is communicated between the session manager and the subscriber using an SDV Channel Change Message (CCM) protocol, which can be implemented as a proprietary protocol or as an open standard. After a channel change request is passed from the subscriber to the session manager, the session manager would normally respond by sending a message that requests the subscriber device to tune to a channel on which the SDV channel will be made available. The message also includes the necessary tuning information for tuning to that SDV channel.

In the present case, the session manager sends a message that requests the subscriber device to tune to a channel or program in accordance with a playlist. That is, tuning information for a channel or program will be sent from the session manager to the subscriber device conforming to a pre-established playlist that the user has made available to the session manager via a parental control server.

Figure 1:
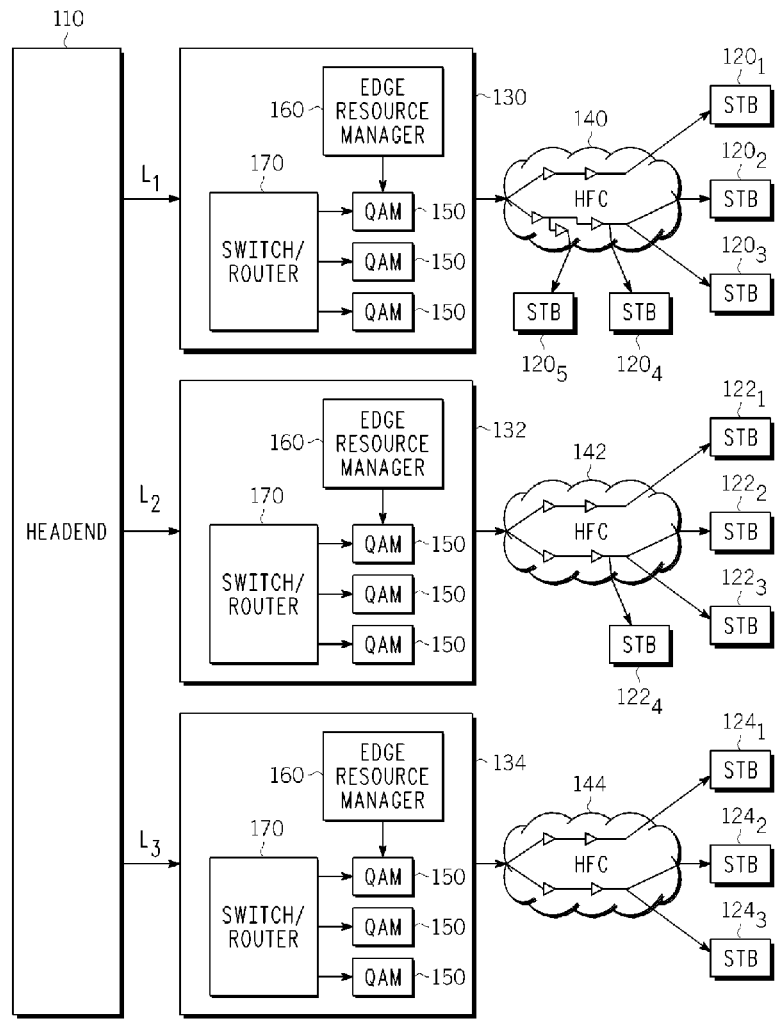
FIG. 1 shows one example of a content delivery system.

FIG. 1 shows one example of a content delivery system architecture 100 for delivering both broadcast channels and switched digital channels to a subscriber during a switched digital video (SDV) session. The SDV session is implemented through a service offering in which application level data generated by a set-top terminal initiates a SDV session request and an SDV manager routes data in accordance with the request to provision the service. Among other components, system architecture 100 comprises a content distribution source such as a headend 110 that is connected to multiple intermediate entities such as hubs 130, 132 and 134. The headend 110 communicates with a switch or router 170 in hubs 130, 132 and 134 over links L1, L2 and L3, respectively. The headend 110 and hubs 130, 132, and 134 may communicate over a packet-switched network such as a cable data network, passive optical network (PON) or the like using, for example, IP multicast addressing.

Some or even all of the hubs are connected to multiple users, typically via distribution networks such as local cable access networks (e.g., HFC networks). For simplicity of explanation only, each hub is shown as being connected to a distinct HFC network, which in turn communicates with end user equipment as illustrated. In particular hubs 130, 132 and 134 in FIG. 1 communicate with access networks 140, 142 and 144, respectively. Each access network 140, 142 and 144 in turn communicates with multiple end user devices such as set top or subscriber terminals. In the example of FIG. 1, access network 140 communicates with set top terminals 1201, 1202, 1203, 1204 and 1205, access network 142 communicates with set top terminals 1221, 1222, 1223 and 1244, and access network 144 communicates with set top terminals 1241, 1242 and 1243.

In addition to the switch or router 170, each hub can include an array of radio frequency transmitter edge devices such as edge QAM modulators 150. The number of edge devices 150 in each hub may vary as needs dictate. For instance, as previously noted, the number of edge devices needed to implement SDV channels is generally much greater than the number of edge devices needed to implement broadcast channels. As used herein, the term "QAM" refers to modulation schemes used for sending signals over cable access networks. Such modulation schemes might use any constellation level (e.g. QAM-16, QAM-64, QAM-256 etc.) depending on the details of a cable access network. A QAM may also refer to a physical channel modulated according to such schemes. Typically, a single QAM modulator can output a multiplex of ten or twelve programs, although the actual number will be dictated by a number of factors, including the communication standard that is employed. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users, over the HFC network. Each transport stream is mapped to a downstream QAM channel. Each QAM channel has a carrier frequency that differs from the carrier frequency of the other channels. The transport streams are mapped according to a channel plan designed by the MSO that operates the network.

Each hub 130, 132 and 134 also includes an edge resource manager 160 for allocating and managing the resources of the edge devices 150. The edge resource manager 160 communicates with and receives instructions from the session manager located in the headend 110. In some cases the edge resource manager and/or session manager can be located in the headend.

Figure 2:
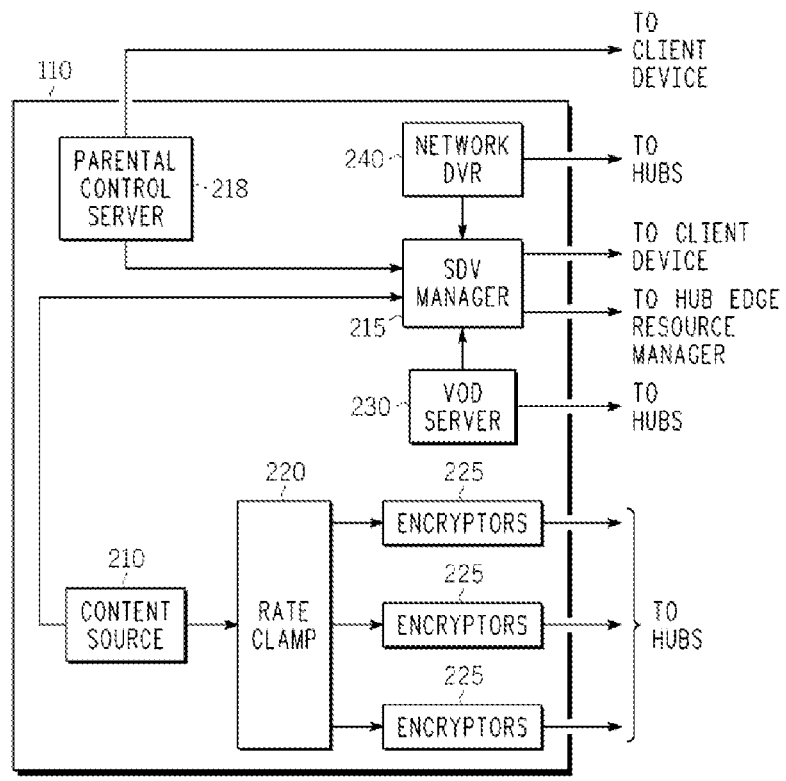
FIG. 2 shows one example of the headend depicted in FIG. 1.

FIG. 2 shows one example of headend 110. The headend 110 includes a broadcast content source 210, which may include, by way of example, satellite receivers, off-air receivers and/or content storage devices such as servers. A SDV manager 215 is used to determine which SDV transport streams are being transmitted at any time and for directing the set top terminals to the appropriate stream. The SDV manager 215 also keeps track of which subscribers are watching which channels and it communicates with the edge resource managers 160 in the hubs so that the content can be switched on and off under the control of the SDV manager 215. In addition, all subscriber requests for a switched digital channel go through the SDV manager 215. The switched digital channels are forwarded to a rate clamp 220 and one or more encryptors 225 using, for example, IP multicast addressing. The content is then encrypted by the encryptors 225 and transmitted to the appropriate hub or hubs. Typically, standard definition (SD) channels are currently rate clamped to 3.75 Mbps while high definition channels are currently rate clamped to between about 12 Mbps and 15 Mbps. The encryptors 225 encrypt the digitally encoded content, often under the control of a conditional access system (not shown).

Headend 110 may also include a network DVR 240. The network DVR 240 stores content that can be transmitted to set top terminal via a hub and access network in response to a user request to play a program stored on the DVR 240. Other user input requests are also serviced by network DVR 240, including, for example, requests to accelerate the playing of a program in the forward direction (e.g., cueing) and in the reverse direction (e.g., reviewing). The content is stored by the network DVR 240 upon a user request. The content may be provided to the network DVR 240 from any available content source, including, for example, content source 210.

It should be noted that in some cases the functionality of some or all of the SDV manager 215 may be transferred to each of the hubs 130, 132 and 134. For example, as described below, Channel Change Messages may be communicated between the set top terminals and the hubs. In addition, some or all of the functionality of the SDV manager 215 may be distributed among other components such as an SDV operations manager (SDVOM), which is sometimes used to configure and monitor SDV systems.

Headend 110 may also include a variety of other components for offering additional services. For example, in FIG. 2 a video on demand (VOD) server 230 is shown for storing programs or other content for distribution to subscribers on an on-demand basis. Although not shown, one of ordinary skill in the art would recognize that other components and arrangements for achieving the various functionalities of headend 110 are possible. For example, the head-end 110 may comprise typical head-end components and services including a billing module, an advertising insertion module, a subscriber management system (SMS), a conditional access system and a LAN(s) for placing the various components in data communication with one another. Headend 110 also includes a parental control server 218, which will be discussed below. It will also be appreciated that the headend configuration depicted in FIG. 2 is a high-level, conceptual architecture and that each network may have multiple head-ends deployed using different architectures.

The edge devices 150 provide programming to the set top terminals using the downstream in-band channels. To communicate control information and the like with the headend 110 and/or the relevant hub, the set top terminals may use out-of-band (OOB) or DOCSIS channels or an IP tunnel or an IP connection and associated protocols. However, in some cases communication of control information and the like can be performed using in-band channels as well.

Control information that may be communicated over the out-of-band channels includes the aforementioned SDV channel change messages (CCM), which are used to pass channel change requests from the headend to the SDV manager 215, which may also reside in the headend 110. In particular, the SDV manager 215 receives channel change requests for switched digital content from headend 110 to bind that content to a session on one of edge devices 150 serving a set top terminal's service group. The channel change request message is generated by the SDV application (or its designated proxy) resident in the headend in response to a program channel request that is prompted by a playlist created by a subscriber and stored at parental control server 218. In response to the channel change request message, the SDV manager 215 sends the frequency and program number where that content may be found to the set top terminal. SDV manager 215, e.g. session manager or Switched Video Manager (SVM), requests the set top terminal to tune to the channel corresponding to this frequency and program number using a so-called force tune function. The SDV manager 215 also receives channel change request messages for non-SDV (e.g., broadcast) channels in order to gather statistics that can be used to better understand subscriber activity and to provide information that can be used for targeted advertising and the like. Another reason to receive non-SDV channel changes is so that the SDV Manager knows when the set top terminals are no longer tuned to an SDV channel, thus allowing the SDV Manager to remove the SDV channel from the network to save bandwidth.

As previously mentioned, since the SDV manager 215 receives channel change requests for SDV and non-SDV channels, the SDV manager can be configured so that the necessary tuning information for a channel or program will be sent from SDV manager 215 to the subscriber device, e.g. STB 120, 122, 124, conforming to a pre-established playlist that the user has made available to the SDV manager 215 via a parental control server 218.

The pre-established playlist may be communicated to the SDV manager 215 in any appropriate manner. For instance, in one example, the user may supply the playlist via an Internet-enabled client device that accesses a user account database in a server associated with or in communication with the SDV manager 215, such as parental control unit or server 218 depicted in FIG. 2. The client device may be the user's own set top terminal or another device such as a personal computer, PDA, networked appliance, cellphone or the like. The user account database may be accessed through an application-level interface residing on the client device such as a web-browser.

Figure 3:
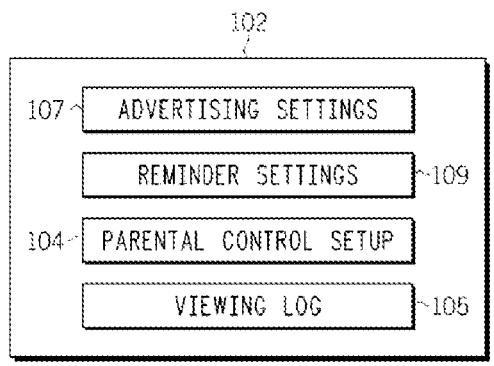
FIG. 3 shows one example of a setup menu that may be displayed to the user when contacting the headend.

FIG. 3 shows one example of a setup menu 102 that may be displayed to the user when contacting the headend 110. The menu presents various settings options such as an advertising setting 107, reminder setting 109, parental control setup menu 104 as well as a viewing log 105. The playlist feature may be accessed by selecting the parental control setup menu 104 so that a playlist may be created.

An example of a playlist is described later in FIG. 7. In some cases an input dialog box will first appear requiring a password to be input prior to accessing the parental playlist interface. In other cases a password may not be required until an attempt is made to alter the control settings. FIG. 3 also shows a viewing log option 105 that allows the subscriber to see a list of all the programming that has been viewed through the various set top terminals in the household over some selected period of time (e.g., the past week). Information in the log can be used, for example, to revise and refine the parental controls that are put in place by the subscriber.

Figure 4:
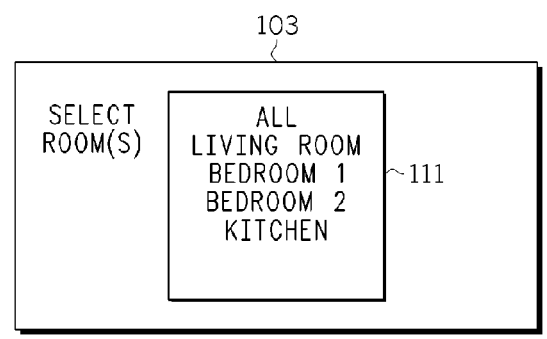
FIG. 4 shows a first parental control interface screen that may be presented to the user if the user has more than one set top terminal in his or residence.

The parental control interface screen 103 of FIG. 4 may be presented to the user if the user has more than one set top terminal in his or her residence. This screen 103 provides the user with a pulldown menu 111 that presents the user with the option to establish a common set of controls for all the set top terminals or to establish different sets of controls on a room by room basis. From this menu, a user, e.g. a subscriber, has the ability to establish a playlist for each set top terminal in the residence.

Figure 5:
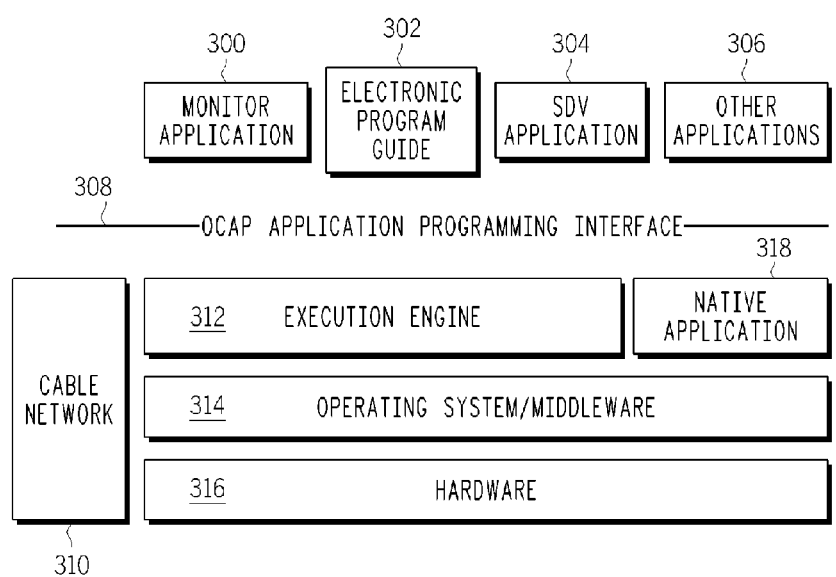
FIG. 5 shows the logical architecture of one particular example of a set top terminal.

FIG. 5 shows the logical architecture of one particular example of a set top terminal such as those depicted in FIG. 1. In this example the set-top terminal is compliant with the OpenCable Application Platform (OCAP) hardware and software environment. The OCAP specification is a middleware software layer specification intended to enable the developers of interactive television services and applications to design such products so that they will run successfully on any cable television system, independent of set-top or television receiver hardware or operating system software choices. As is well known, middleware generally comprises one or more layers of software which are positioned "between" application programs and the lower or physical layers of the network device. Middleware is commonly written for the specific requirements of the operator of the computer system, and the proprietary software purchased by the operator of the computer system. A key role of middleware is to insulate the application programs from the device specific details. By using middleware the application programmers need know very little about the actual network details, since they can rely on the middleware to address the complexities of interfacing with the network. Of course, the set top terminal is not limited to an OCAP-compliant software/hardware architecture. In other cases, for example, the set top terminal may be compliant with MHEG, DASE or Multimedia Home Platform (MHP) middleware. Alternatively, the set top terminal may be based on a proprietary architecture.

Referring to FIG. 5, the top of an OCAP software "stack" includes a Monitor Application 300, Electronic Program Guide (EPG) 302, SDV application 304, and any other applications 306 that may be deployed in a particular network. These applications are run on top of a software layer called the "Execution Engine" 312 and interface to the Execution Engine using the well known OCAP APIs 308. The client device may also include certain software applications or "Native Applications" 318 that do not run within the Execution Engine, but directly run on top of the Operating System/Middleware 314 for the client device. Native Applications are typically written for, e.g., a particular hardware configuration 316 of the set top terminal. Examples of such Native Applications may include management of front panel functionality, remote control interaction, games, and the like. The objects downloaded to the client device in accordance with the techniques described herein may include any of the aforementioned applications and programs as well as additional applications, programs or other objects. However, during an upgrade many of the objects that need to downloaded may be directed to applications located above the OCAP application programming interface 308.

SDV application 304 is loaded onto the set top terminals. Once installed, the set top terminals can be readily configured to generate and transmit to the SDV manager the channel change requests, even if all the channels in the system are in a broadcast configuration.

Figure 6:
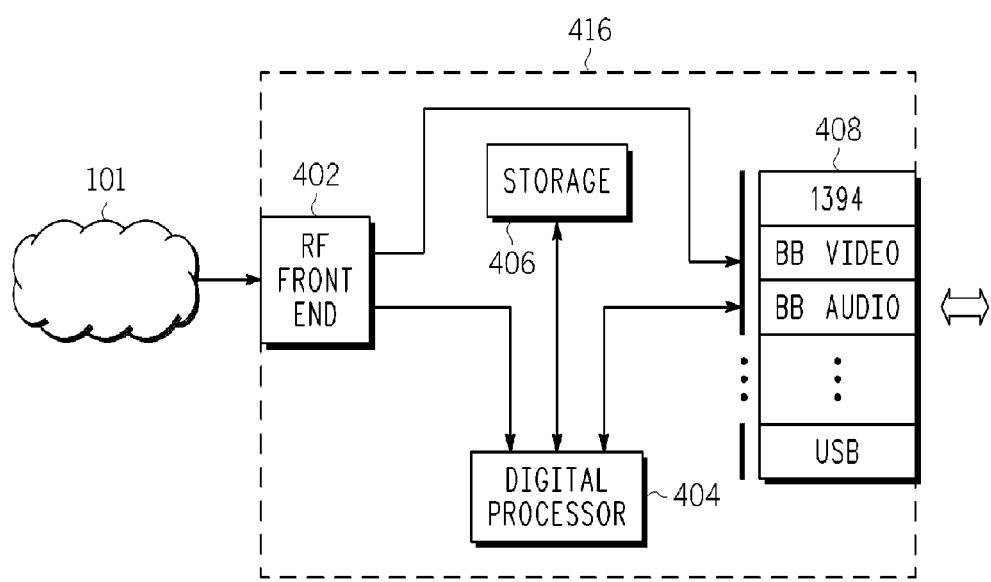
FIG. 6 shows one example of the hardware employed in the set top terminal of FIG. 5

FIG. 6 shows one example of the set top terminal hardware 416. The device hardware 416 generally includes an RF front end 402 (including a modulator/demodulator and a tuner or tuners) for interfacing with the distribution network (e.g., HFC network 140) of FIG. 1, digital processor(s) 404, storage device 406, and a plurality of interfaces 408 (e.g., video/audio interfaces, IEEE-1394 "Firewire", USB, serial/parallel ports, etc.) for establishing communication with other end-user devices such as televisions, personal electronics, computers, WiFi or other network hubs/routers, etc. Other components which may be utilized within the device include one or more decoder stages, various processing layers (e.g., DOCSIS MAC, OOB channels, MPEG, etc.) as well as media processors and other specialized SoC or ASIC devices. These additional components and functionality are well known to those of ordinary skill in the art and accordingly are not described further herein.

As noted, the SDV application 304 is responsible for communicating the channel change information (e.g., SDV CCMs) between the set top terminal and the SDV manager. The SDV application 304 also receives from the SDV manager the control messages that request the set top terminal to tune to a particular channel or program corresponding to the tuning information provided in the control message. The SDV manager, may, in accordance with a playlist send one or more control messages to the set top terminal. The one or more control messages include tuning information for tuning to one or more programs or channels at times indicated in the playlist.

FIG. 7 illustrates a playlist 700 in accordance with one embodiment. The example playlist shown in FIG. 7 shows time, channel, program, and rating information of items added to the playlist by a subscriber. A parent may use a convenient internet-based interface, e.g. via parental control server 218 to develop a playlist for viewing by a child. Since the playlist is created from an internet-based webpage, the playlist may be created while the subscriber is in the home or away. The playlist is created using an internet-based version of the electronic program guide available on the set top terminal. This playlist is combined with a calendar function that allows for the playlist to be repeated each weekday. Once the playlist is established, the playlist is executed each day by the Switched Video Manager (SVM), e.g. SDV manager 215 or session manager. The subscriber has selected programming that begins at 3:00PM, 3:30PM, 4:00PM, and 4:30PM. The SVM will send force tune messages to the set top terminal in order to execute the playlist at each pertinent time interval and tune to the desired channel or program. Using the example of FIG. 7, the SVM would send a force tune to PBS at 3:00PM. Implementing a playlist of this type creates what is often called a "walled garden" for a child. In this example, the child would return from school and simply turn on the television. The headend, using a session manager tunes to programming for the child at the appropriate time as dictated by the playlist.

Figure 8:
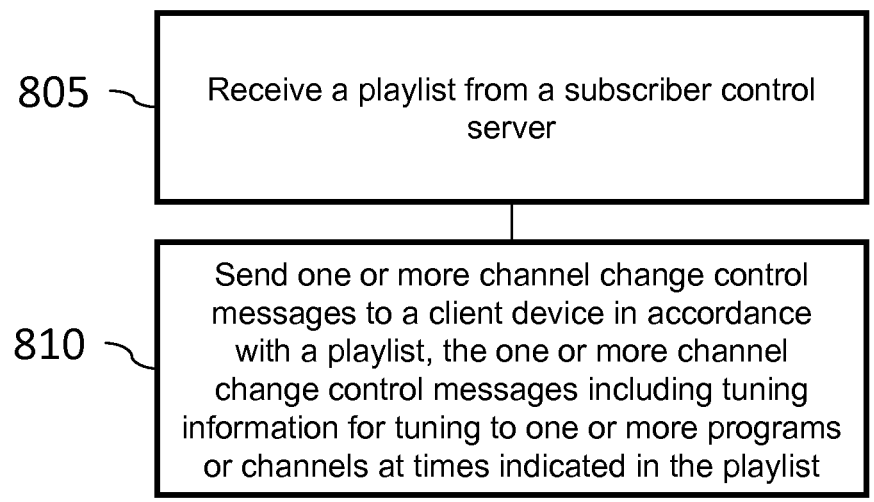
FIG. 8 illustrates a flowchart of a method 800 for providing parental control via a playlist in accordance with one embodiment.

FIG. 8 illustrates a flowchart of a method 800 in accordance with one embodiment. FIG. 8 shows a method for providing parental control via a playlist. At step 805, a playlist is received from a subscriber control server, e.g. parental control server 218.

In one embodiment, the playlist is created using an internet-based interface. The playlist may be created via the internet-based interface with parental control server 218 using an internet based version of an electronic program guide available on a client, e.g. a set top terminal. The playlist may include time information, channel information, program information, and rating information.

At step 810, one or more channel change control messages are sent to the client device in accordance with the playlist. The one or more channel change control messages may comprise tuning information for tuning to one or more programs or channels at times indicated in the playlist.

In one embodiment, the one or more channel change control messages may be implemented using protocols of a Switched Digital Video (SDV) system. In this embodiment, a session manager, e.g. SDV manager or Switched Video Manager (SVM) implements the playlist received from the subscriber control server. At appropriate times dictated by the playlist, channel change control messages are sent to the client, e.g. set top terminal in order to "force tune" to a channel or program.

In one embodiment, the one or more channel change control messages are implemented using a subset of channel change protocols deployed in a mini-client, e.g. a driver, to provide channel change messages in non-Switched Digital Video (SDV) systems.

In one embodiment, channel changes via the client remote control are disabled during implementation of the playlist. When channel changes are disabled, the session manager receives a channel change request from the client. In response to the channel change request, the session manager responds by sending tuning information in accordance with the playlist, e.g. tuning information associated with the timing information located in the presently implemented playlist.

The processes described above, including but not limited to those presented in connection with FIG. 8, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium, e.g. a non-transitory computer-readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus has been described for allowing SDV system subscribers to conveniently establish programming playlists that may be implemented in a residential or other environment. The playlist is implemented by the SDV manager or other appropriate entity by forcing the set top terminal, e.g. a client or other subscriber end device, to tune to programming or channels in accordance with a pre-defined playlist.

While the foregoing is directed to embodiments of the present invention, other and further embodiments of the invention may be devised without departing from the basic scope thereof, and the scope thereof is determined by the claims that follow.

What is claimed is:

1. A method for providing parental control via a playlist, the method comprising:
   receiving, at a network device, a playlist from a control server, wherein the network device delivers content over a cable network to subscriber client devices;
   in response to the received playlist, the network device executing the playlist by:
      generating one or more force tune channel change control messages for transmitting to a client device associated with the playlist; and
      disabling, during times indicated in the playlist, the network device from executing channel changes not associated with the playlist when the network device receives a channel change request from the client device over the cable network; and
   sending the one or more force tune channel change control messages from the network device to the client device over the cable network, the one or more force tune channel change control messages including tuning information for tuning the client device to one or more programs or channels at times indicated in the playlist.

2. The method of claim 1, wherein the one or more force tune channel change control messages are implemented using protocols of a Switched Digital Video (SDV) system.

3. The method of claim 1, wherein the one or more force tune channel change control messages are implemented using a subset of channel change protocols deployed in a mini-client to provide force tune channel change control messages in non-Switched Digital Video (SDV) systems.

4. The method of claim 1, wherein the playlist comprises time information, channel information, program information, and rating information.

5. The method of claim 1, wherein the playlist is created using an internet based interface.

6. The method of claim 5, wherein the playlist is created via the internet based interface using an internet based version of an electronic program guide available on the client.

7. At least one non-transitory computer-readable medium encoded with instructions which, when executed by a processor, performs a method including:
   receiving, at a network device, a playlist from a control server, wherein the network device delivers content over a cable network to subscriber client devices;
   in response to the received playlist, the network device executing the playlist by:
      generating one or more force tune channel change control messages for transmitting to a client device associated with the playlist; and
      disabling, during times indicated in the playlist, the network device from executing channel changes not associated with the playlist when the network device receives a channel change request from the client device over the cable network; and
   in accordance with the playlist, sending the one or more force tune channel change control messages from the network device to the client device over the cable network, the one or more force tune channel change control messages including tuning information for tuning the client device to one or more programs or channels at times indicated in the playlist.

8. The non-transitory computer-readable medium of claim 7, wherein the one or more force tune channel change control messages are implemented using protocols of a Switched Digital Video (SDV) system.

9. The non-transitory computer-readable medium of claim 7, wherein the one or more force tune channel change control messages are implemented using a subset of channel change protocols deployed in a mini-client to provide force tune channel change control messages in non-Switched Digital Video (SDV) systems.

10. The non-transitory computer-readable medium of claim 7, wherein the playlist comprises time information, channel information, program information, and rating information.

11. The non-transitory computer-readable medium of claim 7, wherein the playlist is created using an internet-based interface.

12. The non-transitory computer-readable medium of claim 11, wherein the playlist is created via the internet-based interface using an internet based version of an electronic program guide available on the client.

13. A content delivery system headend, comprising:
   a Switched Digital Video (SDV) manager for receiving a playlist from a control server and coordinating SDV sessions requested by subscribers over an access network;
   an input for receiving content to be broadcast during the SDV sessions, wherein the SDV manager delivers the content over a cable network to the subscribers;
   the SDV manager for executing the playlist by:
      generating one or more force tune channel change control messages for transmitting to a client device associated with the playlist; and
      disabling, during times indicated in the playlist, the SDV manager from executing channel changes not associated with the playlist when the SDV manager receives a channel change request from a client device over the cable network, the client device associated with the playlist; and
   a subscriber control unit for sending the one or more force tune channel change control messages to the client device over the cable network, the one or more force tune channel change control messages including tuning information for tuning the client device to one or more programs or channels at times indicated in the playlist.

* * * * *